US006438681B1

United States Patent
Arnold et al.

(10) Patent No.: US 6,438,681 B1
(45) Date of Patent: Aug. 20, 2002

(54) DETECTION OF DATA HAZARDS BETWEEN INSTRUCTIONS BY DECODING REGISTER INDENTIFIERS IN EACH STAGE OF PROCESSING SYSTEM PIPELINE AND COMPARING ASSERTED BITS IN THE DECODED REGISTER INDENTIFIERS

(75) Inventors: Ronny Lee Arnold, Ft. Collins; Donald Charles Soltis Jr., Fort Collins, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/490,390

(22) Filed: Jan. 24, 2000

(51) Int. Cl.⁷ .............................................. G06F 15/00
(52) U.S. Cl. ........................ 712/216; 712/217; 712/218; 712/219
(58) Field of Search ................................ 712/216, 217, 712/218, 219

(56) References Cited

U.S. PATENT DOCUMENTS

| | | | | |
|---|---|---|---|---|
| 4,626,669 A | * | 12/1986 | Davis et al. ................. | 235/380 |
| 5,150,068 A | * | 9/1992 | Kawashima et al. ......... | 327/145 |
| 5,471,598 A | * | 11/1995 | Quattromani et al. ....... | 822/122 |
| 5,737,629 A | * | 4/1998 | Zuraski, Jr. et al. .......... | 712/23 |
| 5,765,035 A | * | 6/1998 | Tran ............................ | 712/216 |
| 5,848,287 A | * | 12/1998 | Tran et al. .................... | 712/23 |
| 5,859,999 A | | 1/1999 | Morris et al. ................. | 395/565 |
| 5,860,017 A | | 1/1999 | Sharangpani et al. .. | 395/800.23 |
| 6,115,808 A | * | 9/2000 | Arora .......................... | 712/219 |
| 6,202,119 B1 | * | 3/2001 | Manning ...................... | 711/5 |
| 6,219,781 B1 | * | 4/2001 | Arora .......................... | 712/217 |

OTHER PUBLICATIONS

Alexander Wolfe, "Patents Shed Light on Merced: Techniques of Predication and Speculation Detailed," Electronic Engineering Times, Feb. 15, 1999, pp. 43–44.

Patterson, et al., "Computer Architecture: A Quantitative Approach," Morgan Kaufmann Publishers, Inc., 2ed, pp. 150–193.

Gary Lauterbach, "Sun's Next–Generation High–End SPARC Microprocessor," Microprocessor Forum, Oct. 14–15, 1997, pp. 3–6.

* cited by examiner

*Primary Examiner*—Larry D. Donaghue
*Assistant Examiner*—Nabil El-Hady

(57) ABSTRACT

A computer system utilizing a processing system capable of efficiently comparing register identifiers to detect data hazards between instructions of a computer program is used to execute the computer program. The processing system utilizes at least one pipeline, a first decoder, a second decoder, and comparison logic. The pipeline receives and simultaneously processes instructions of a computer program. The first and second decoders are coupled to the pipeline and decode register identifiers associated with instructions being processed by the pipeline. The comparison logic is interfaced with the first and second decoders and respectively compares the decoded register identifiers produced by the first and second decoders to other decoded register identifiers.

9 Claims, 8 Drawing Sheets

DETECTION OF DATA HAZARDS BETWEEN INSTRUCTIONS BY DECODING REGISTER INDENTIFIERS IN EACH STAGE OF PROCESSING SYSTEM PIPELINE AND COMPARING ASSERTED BITS IN THE DECODED REGISTER INDENTIFIERS

BACKGROUND OF THE INVENTION

1. Field of the Invention

The present invention generally relates to data processing techniques and, in particular, to a system and method for processing instructions of a computer program and for comparing register identifiers associated with the instructions to detect data hazards between the instructions.

2. Related Art

To increase the performance of many processors, pipeline processing has been developed. In pipeline processing, a processor is equipped with at least one pipeline that can simultaneously process multiple instructions. Therefore, execution of one instruction in the pipeline may be commenced before the results of execution of a preceding instruction in the pipeline are available, and as a result, errors from data dependency hazards are possible.

A data dependency exists when one instruction to be executed by a pipeline utilizes data produced via execution of another instruction, and the data dependency creates a data dependency hazard when the data produced by the other instruction is not yet available for use by the one instruction. For example, a later instruction, when executed, may utilize data that is produced by execution of an earlier instruction (e.g., a later add instruction may utilize data that is retrieved by an earlier load instruction). If the later instruction executes before the data from execution of the earlier instruction is available, then the later instruction utilizes incorrect data, resulting in a data dependency error. Accordingly, a data dependency hazard exists between the two instructions, until the data utilized by the later instruction is available or until the data dependency error occurs.

Needless to say, it is important to detect data dependency hazards so that data dependency errors can be prevented. However, circuitry for detecting data dependency hazards is often complex and often utilizes a relatively large amount of area within a processor. This is especially true in superscalar processors, which include a plurality of pipelines that simultaneously execute instructions. In this regard, an instruction in one pipeline may not only have a dependency with another instruction in the same pipeline but may also have a dependency with another instruction in another pipeline. Therefore, to adequately check for data dependency hazards, a first instruction in one pipeline should be compared with each instruction in each pipeline that could share a data dependency hazard with the first instruction. Consequently, as the number of pipelines within a processor increases, the circuitry and complexity required to detect data dependencies that define data dependency hazards increase dramatically.

Thus, a heretofore unaddressed need exists in the industry for minimizing the circuitry and complexity required to detect data hazards between instructions of a computer program.

SUMMARY OF THE INVENTION

The present invention overcomes the inadequacies and deficiencies of the prior art as discussed hereinbefore. Generally, the present invention provides a system and method for processing instructions of a computer program and for detecting data hazards between the instructions.

In architecture, the system of the present invention utilizes at least one pipeline, a first decoder, a second decoder, and comparison logic. The pipeline receives and simultaneously processes instructions of a computer program. The first and second decoders are coupled to the pipeline and decode register identifiers associated with instructions being processed by the pipeline. The comparison logic is interfaced with the first and second decoders and respectively compares the decoded register identifiers produced by the first and second decoders to other decoded register identifiers.

In accordance with another feature of the present invention, each decoded register identifier includes a plurality of bits that respectively correspond to a plurality of registers. To identify a particular register, the bit corresponding with the particular register is asserted, and a remainder of the bits is deasserted. Therefore, the comparison logic may determine whether a data dependency hazard exists between two instructions by determining whether decoded register identifiers associated with the two instructions match.

The present invention can also be viewed as providing a method for processing instructions of a computer program. The method can be broadly conceptualized by the following steps: transmitting an instruction to a pipeline of a processing system; decoding an encoded register identifier associated with the instruction while the instruction is being processed by a first portion of the pipeline; decoding the encoded register identifier while the instruction is being processed by a second portion of the pipeline; producing a first decoded register identifier based on the step of decoding the encoded register identifier while the instruction is being processed by the first portion of the pipeline; producing a second decoded register identifier based on the step of decoding the encoded register identifier while the instruction is being processed by the second portion of the pipeline; comparing the first and second decoded register identifiers to other decoded register identifiers; and detecting a data dependency hazard based on the comparing step.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1:
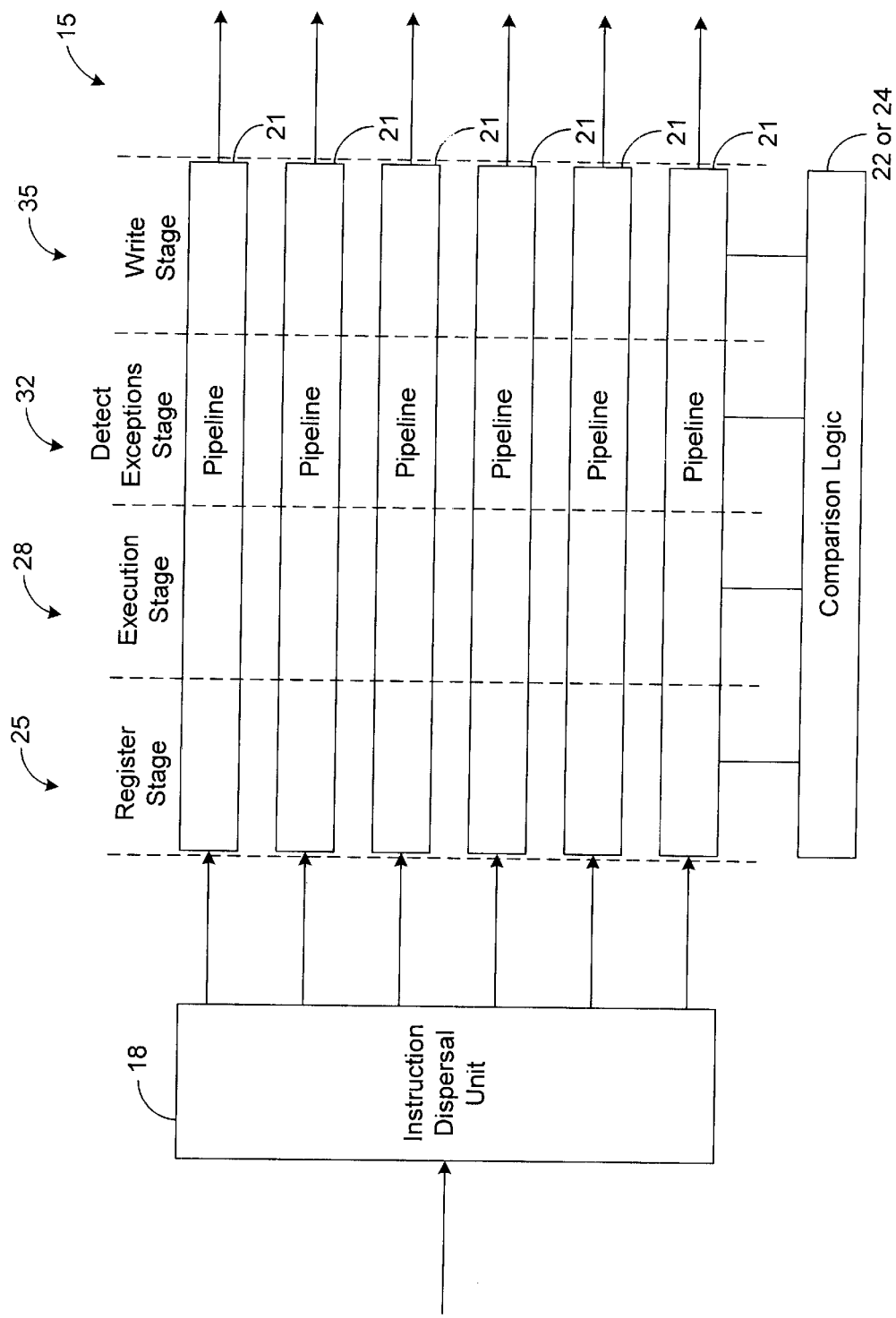
FIG. 1 is a block diagram illustrating a processing system in accordance with the prior art.

The present invention generally relates to a system and method for detecting data hazards within a processing system that executes instructions of a computer program so that errors from the data hazards can be prevented. To illustrate the principles of the present invention, refer to FIG. 1, which depicts a conventional superscalar processing system 15. The processing system 15 includes an instruction dispersal unit 18 that receives instructions of a computer program and assigns each instruction to one of a plurality of pipelines 21. Each pipeline 21 is configured to execute each instruction received by the pipeline 21.

Each pipeline 21 is usually configured to only process particular types of instructions (e.g, integer operation, floating point operation, memory operation, etc.). Therefore, the instruction dispersal unit 18 is configured to assign each instruction only to a pipeline 21 compatible with the instruction. Furthermore, although comparison logic 22 or 24 is shown for simplicity as being coupled to one pipeline 21 in FIG. 1, it should be noted that each pipeline 21 is similarly coupled to comparison logic 22 or 24.

As shown by FIG. 1, pipelines 21 typically process instructions in stages. As used herein, a "stage" is any portion of a pipeline 21 that processes instructions and that includes a latch at its input so that the timing of the data input to the stage can be controlled in response to edges of a clock signal. The pipelines 21 shown by FIG. 1 process the instructions in four stages: a register stage 25, an execution stage 28, a detect exceptions stage 32, and a write stage 35. In other embodiments, it is possible for the processing system 15 to process instructions in other types and combinations of stages.

In the system 15 shown by FIG. 1, an instruction received by one of the pipelines 21 is first processed in the register stage 25. In the register stage 25, any operands necessary for the execution of the instruction are obtained. Once the operands have been obtained, the instruction enters the execution stage 28, which executes the instruction. After the instruction has been executed in the execution stage 28, the instruction enters a detect exceptions stage 32, which checks conditions, such as overruns during execution, for example, that may indicate data unreliability. After the detect exceptions stage 32 is completed, the instruction enters a write stage 35, which writes the results of the execution stage 28 to a register or a location in memory.

Typically, each stage 25, 28, 32, and 35 of the pipelines 21 processes only one instruction at a time, and the stages 25, 28, 32 and 35 may simultaneously process their respective instruction such that each pipeline 21 is capable of processing multiple instructions. For example, in the system 15 shown by FIG. 1, it is possible for one of the pipelines 21 to simultaneously process four instructions, in which each stage 25, 28, 32, and 35 of the pipeline 21 is processing one of the four instructions. Furthermore, each pipeline 21 may process instructions as other pipelines 21 are processing other instructions. Therefore, it is possible to simultaneously process a relatively large number of instructions via the system 15 shown by FIG. 1.

To control timing, the instructions are typically stepped through the stages 25, 28, 32, and 35 in response to edges of a clock signal. For example, an instruction in the write stage 35 may step out of a pipeline 21 on the same clock edge that instructions in the register stage 25, the execution stage 28, and the detect exceptions stage 32 respectively step into the execution stage 28, the detect exceptions stage 32, and the write stage 35 of the same pipeline 21. However, an instruction is typically prevented from stepping out of a stage 25, 28, 32, or 35 until the stage can completely process the instruction without data dependency errors.

In this regard, it is sometimes necessary to stall an instruction in a stage 25, 28, 32, or 35 when processing of the instruction in the stage 25, 28, 32, or 35 cannot complete without data dependency errors prior to the next active edge of the clock signal. For example, processing of instructions in the detect exceptions stage 32 and the write stage 35 may complete without data dependency errors, and the instructions in these stages 32 and 35 may then respectively step out of these stages 32 and 35 on the next edge of the clock signal. However, the instruction in the execution stage 28 of the same pipeline 21 may utilize data that is not available (e.g., that is still being retrieved by an earlier load instruction) prior to the occurrence of the next clock edge. Therefore, the instruction in the execution stage 28 is prevented from stepping out of the execution stage 28 on the next clock edge, since the processing of the instruction cannot be completed without errors prior to the occurrence of the next clock edge. In other words, the instruction in the execution stage 28 is stalled. This instruction should remain stalled until the execution stage 28 is able to completely process the instruction without data dependency errors. U.S. patent application entitled "Superscalar Processing System and Method for Efficiently Performing In-Order Processing of Instructions," assigned Ser. No. 09/390,199, and filed on Sep. 7, 1999, which is incorporated herein by reference, describes in more detail a suitable process of stalling instructions to prevent data dependency hazards.

Since each stage 25, 28, 32, and 35 is usually configured to process only one instruction at a time, the instruction in the register stage 25 of the same pipeline 21 in the foregoing example should also be stalled in the register stage 25 until at least the instruction in the execution stage 28 is allowed to step out of the execution stage 28. Therefore, when an instruction is stalled in one of the stages 25, 28, 32, or 35, each later instruction being processed by the same pipeline 21 should also be stalled, even if the later instruction is otherwise ready to step into the next stage 28, 32, or 35.

As the instructions are stepped through the pipelines 21, it is desirable to detect data dependency hazards so that data dependency errors can be prevented, usually by stalling at least one of the instructions. A data dependency hazard is usually detected by detecting a data dependency and by determining that the data associated with the data dependency is not yet available. Therefore, to detect whether or not a data dependency hazard exists between two instructions, two determinations are usually made: 1) whether a data dependency exists between the two instructions and 2) whether the data associated with the data dependency (i.e., the data produced by one of the instructions and utilized by the other instruction) is available.

A data dependency between two instructions is usually detected by comparing register identifiers associated with the instructions. In this regard, each instruction usually includes at least one register identifier that indicates which register is to be used by the instruction. For example, an instruction (referred to as a "producer") that produces (e.g., writes) data includes a register identifier that identifies the register where data should be written when the producer is executed, and an instruction (referred to as a "consumer") that utilizes (e.g., retrieves) stored data or data produced by a producer includes a register identifier that identifies the register where data should be retrieved from when the consumer is executed. If a later stage 28, 32, or 35 in one of the pipelines 21 is processing a producer having the same register identifier as a consumer being processed by an earlier stage 25, 28, or 32, then a data dependency exists between the two instructions. Furthermore, if the data produced by the producer and used by the consumer is not yet available to the consumer, then the data dependency between the two instructions creates a data dependency hazard.

For the purposes of this document, a stage is "later" than another stage if an instruction is processed by the stage after the instruction has been processed by the other stage. For example, in FIG. 1, the execution stage 28 is later than the register stage 25, and the register stage 25 is earlier than the execution stage 28.

It should be noted that most instructions are both consumers and producers in that they both retrieve data and store data during execution. As used herein, the register identifier of an instruction referred to as a "producer" identifies a register where the instruction stores data, even though the instruction may retrieve data from another register and, therefore, be associated with another register identifier. Furthermore, the register identifier of an instruction referred to as a "consumer" identifies a register where the instruction retrieves data, even though the instruction may store data in another register and, therefore, be associated with another register identifier.

Since operands for consumers are obtained in the register stage 25, the register identifiers of each consumer in the register stage 25 are usually compared to the register identifiers of each producer in the later stages 28, 32, and 35 to determine whether any data dependencies that create data dependency hazards exist with the consumers in the register stage 25. To enable such comparisons of the register identifiers, the register identifier associated with each instruction is sometimes stepped through the pipelines 21 along with the instruction.

Figure 2:
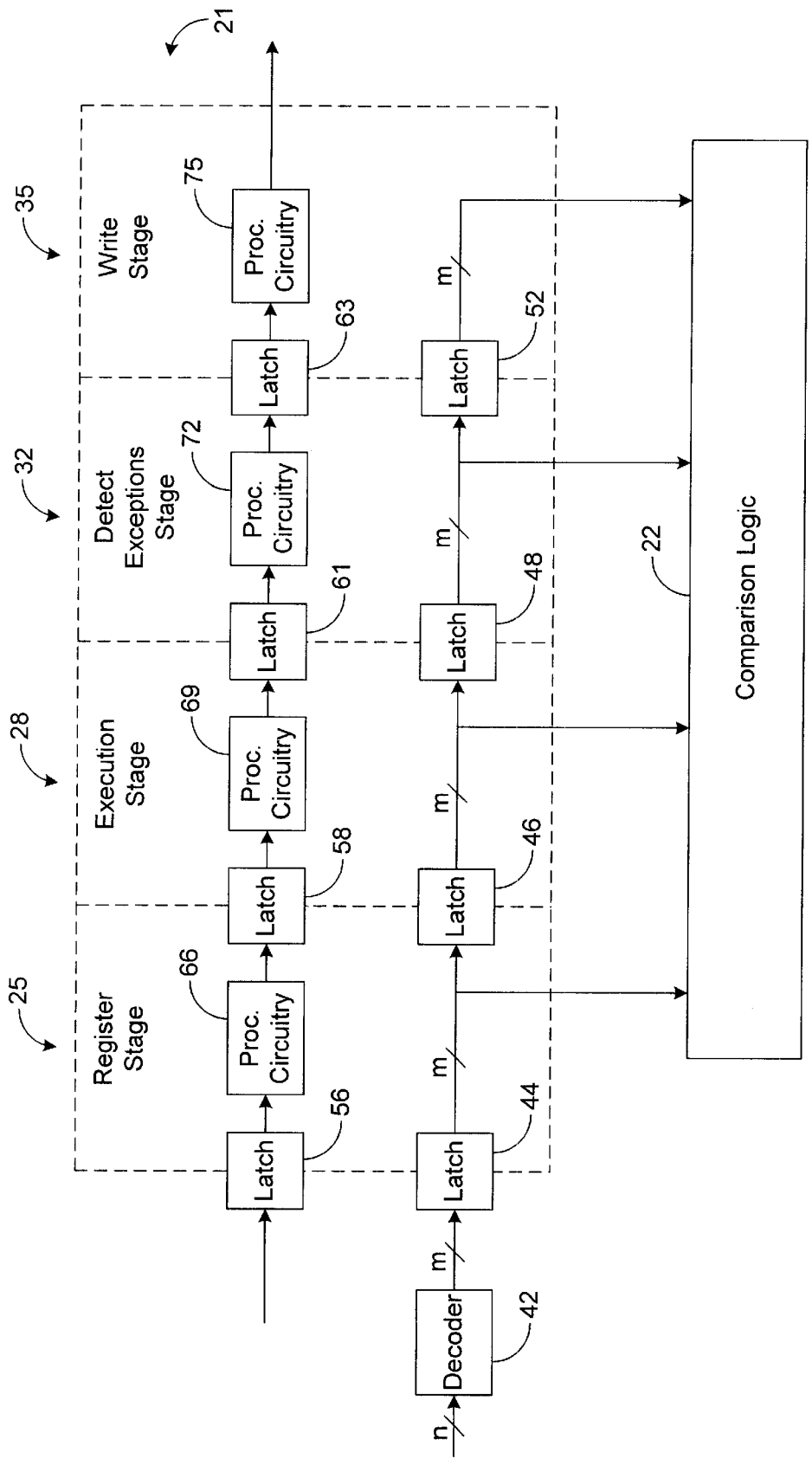
FIG. 2 is a block diagram illustrating a more detailed view of a pipeline depicted in FIG. 1.

In this regard, the register identifier, which is usually an n-bit encoded value, is first decoded into an m-bit value (where m is usually $2^n$) by a decoder 42, as shown by the conventional system of FIG. 2. The value m corresponds to the number of registers associated with the system 15, and each bit in the m-bit register identifier corresponds to a particular register. The decoder 42 is configured to determine which register is identified by the n-bit register identifier and to assert the bit in the m-bit register identifier that corresponds to the identified register. The remainder of the bits in the m-bit register identifier are deasserted. Therefore, the m-bit register identifier identifies one of the registers, when the bit associated with the one register is asserted.

The m-bit register identifier is respectively latched into stages 25, 28, 32, and 35 by latches 44, 46, 48, and 52 on the same edges that the instruction associated with the register identifier is respectively latched into stages 25, 28, 32, and 35 by latches 56, 58, 61, and 63. Therefore, the register identifier and its associated instruction should be in the same stage 25, 28, 32, or 35 at the same time. As shown by FIG. 2, the instruction associated with the register identifier is respectively processed by processing circuitry 66, 69, 72, and 75 once the instruction is respectively latched into the stages 25, 28, 32, and 35. The processing circuitry 66, 69, 72, and 75 respectively perform the functionality described hereinbefore for the stages 25, 28, 32, and 35. In this regard, the processing circuitry 66 obtains operands, the processing circuitry 69 executes the instruction, the processing circuitry 72 checks for exceptions, and the processing circuitry 75 writes data produced via execution of the instruction into a register or location in memory.

The m-bit register identifiers in the stages 25, 28, 32, and 35 are transmitted to comparison logic 22, which is configured to compare the m-bit register identifiers to determine whether a data dependency exists between any of the instructions associated with the m-bit register identifiers. In this regard, to determine whether a consumer in the register stage 25 has a data dependency with any of the producers in the later stages 28, 32, and 35, the comparison logic 22 compares the m-bit register identifier of the consumer in the register stage 25 with each of the m-bit register identifiers of the producers in the execution stage 28, the detect exceptions stage 32, and the write stage 35. If any of the compared m-bit register identifiers of the producers in any of the stages 28, 32, or 35 matches the m-bit register identifier of the consumer in the register stage 25, then the comparison logic 22 determines that a data dependency exists between the instructions associated with the two matching register identifiers. Furthermore, if the data produced by one of the instructions in stages 28, 32, or 35 that has a data dependency with the consumer in the register stage 25 is not yet available for use by the consumer in the register stage 25, then the comparison logic 22 determines that a data dependency hazard exists between the two instructions.

Figure 3:
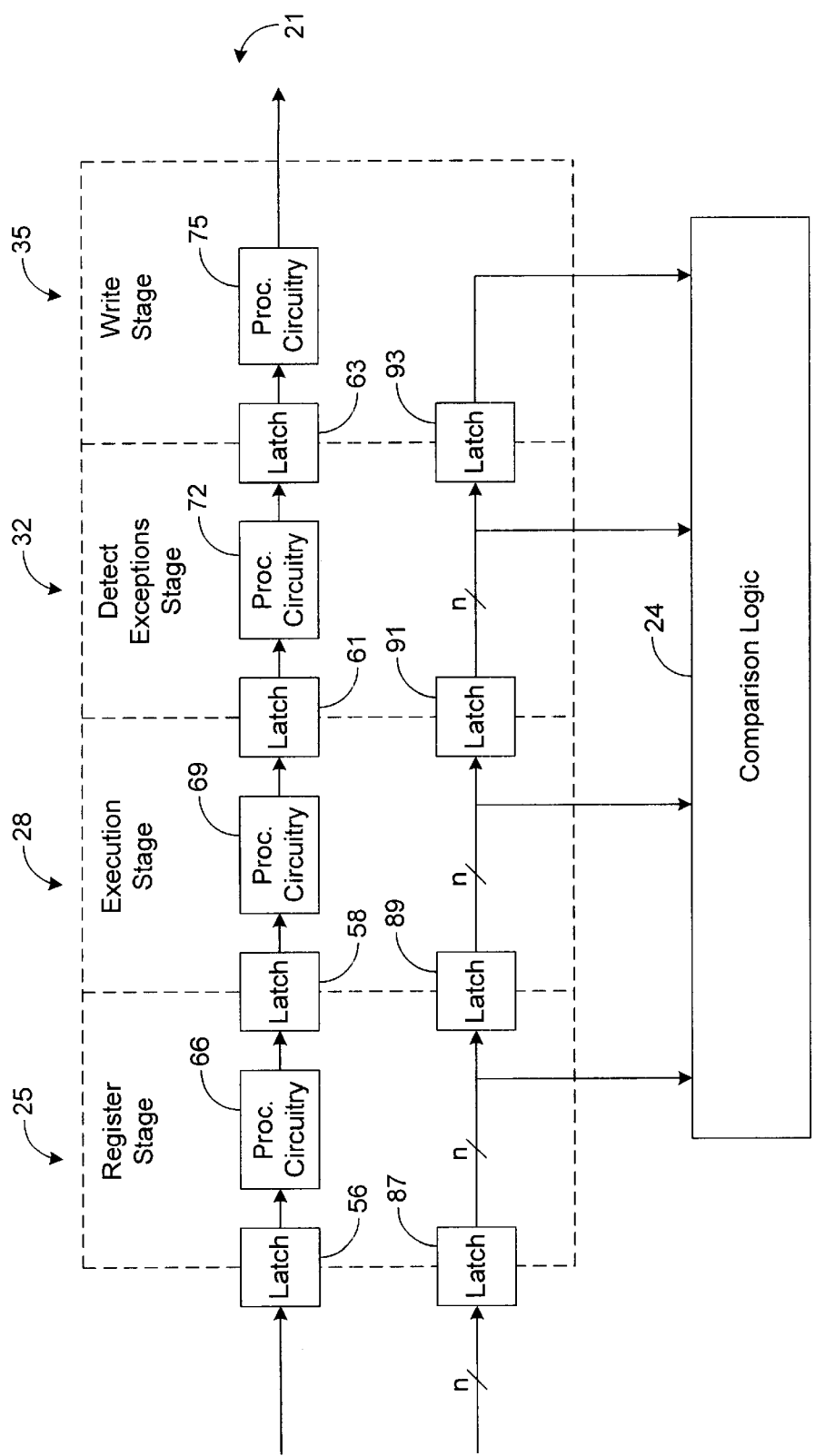
FIG. 3 is a block diagram illustrating another embodiment of the pipeline depicted in FIG. 2.

FIG. 3 shows another embodiment of circuitry that is conventionally used to process instructions in one of the pipelines 21 and to check for data dependencies that create data dependency hazards. The instruction associated with an n-bit encoded register identifier is latched into stages 25, 28, 32, and 35 and processed by processing circuitry 66, 69, 72, and 75, as described above. However, the n-bit register identifier is not decoded by a decoder 42 (FIG. 2). instead, the n-bit register identifier is latched into stages 25, 28, 32, and 35 by latches 87, 89, 91, and 93, respectively, on the same edges that the instruction is respectively latched into stages 25, 28, 32, and 35. Therefore, the n-bit register identifier steps through the stages 25, 28, 32, and 35 along with the instruction associated with the n-bit register identifier.

The n-bit register identifier in each stage 25, 28, 32, and 35 is transmitted to comparison logic 24, which is configured to compare the register identifiers to determine whether a data dependency that defines a data dependency hazard exists between any of the instructions associated with the n-bit register identifiers. In this regard, to determine whether a consumer in the register stage 25 has a data dependency with any of the producers in the later stages 28, 32, and/or 35, the comparison logic 24 compares the n-bit register identifier of the consumer in the register stage 25 with each of the n-bit register identifiers of producers in the execution stage 28, the detect exceptions stage 32, and the write stage 35. Since the n-bit register identifiers are encoded, the comparison logic 24 uses n-bit comparators to determine whether the register identifier in the register stage 25 matches any of the register identifiers in the stages 28, 32, and/or 35. If any of the compared n-bit register identifiers of the producers in any of the stages 28, 32, or 35 matches the n-bit register identifier of the consumer in the register stage 25, then the comparison logic 24 determines that a data dependency exists between the instructions associated with the two matching register identifiers. Furthermore, if the data produced by one of the instructions in stages 28, 32, or 35 that has a data dependency with the consumer in the register stage 25 is not yet available for use by the consumer in the register stage 25, then the comparison logic 24 determines that a data dependency hazard exists between the two instructions.

It should be noted that, for simplicity, the circuitry depicted by FIG. 2 and FIG. 3 steps only register identifiers of instructions in a single pipeline 21 through the stages 25, 28, 32, and 35. Furthermore, the aforementioned circuitry processes only a single register identifier for each instruction processed by the pipeline 21. Since many instructions include more than one register identifier, additional circuitry should be implemented as necessary to handle multiple register identifiers for the same instruction. Furthermore, the register identifier of the consumer in the register stage 25 should not only be compared with the register identifiers of the producers in the stages 28, 32, and/or 35 in the same pipeline 21 but should also be compared with the register identifiers of each producer in any of the later stages 28, 32, and/or 35 of any of the other pipelines 21. Therefore, as the number of pipelines 21 increases, the wiring and other circuitry for detecting data dependency hazards increase dramatically.

In particular, given that the amount of latency required for data produced by producers to become available to consumers is neither uniform nor constant, the circuitry required for detecting data dependency hazards and for preventing data dependency errors is relatively complex. Furthermore, in FIG. 2, the number of registers (m) is usually relatively large for higher performance processing systems 15. Therefore, the number of wires needed to latch the m-bit register identifier into each stage 25, 28, 32, and 35 (i.e., to transmit the m-bit register identifier from stage-to-stage) is relatively large (e.g., in the hundreds). This additional wiring utilizes valuable space within the processing system 15 and further complicates the overall wiring design of the system 15.

In addition, the n-bit comparators (including the wiring for the n-bit comparators) for comparing the encoded register identifiers in FIG. 3 also utilize valuable space within the processing system 15 and increase the complexity of the wiring design of the system 15. Furthermore, separately latching the m-bit register identifiers and the instructions associated with the register identifiers through the stages 25, 28, 32, and 35 increases the number of latches and, therefore, the amount of circuitry and space required to implement the system 15. The problems relating to complexity and space are exacerbated as the number of pipelines 21 increases.

Figure 4:
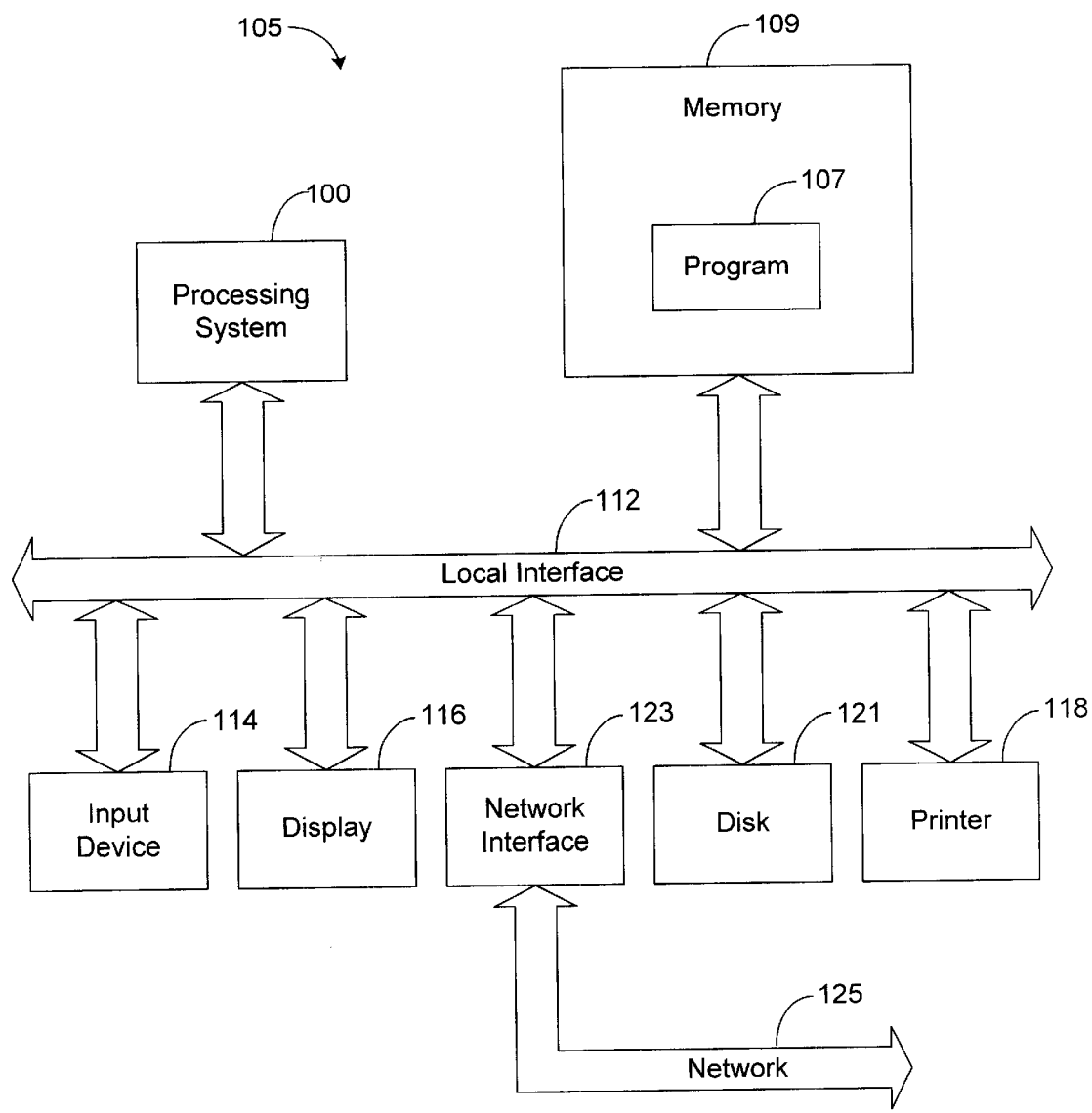
FIG. 4 is a block diagram illustrating a computer system that employs a processing system in accordance with the principles of the present invention.

In general, the present invention provides a system and method that reduces the amount of wiring and other circuitry necessary to compare register identifiers and, therefore, to detect data dependency hazards. FIG. 4 depicts a processing system 100 in accordance with the principles of the preferred embodiment of the present invention. As shown by FIG. 4, the processing system 100 may be employed within a computer system 105 for executing instructions from a computer program 107 that is stored in memory 109.

The processing system 100 communicates to and drives the other elements within the system 105 via a local interface 112, which can include one or more buses. Furthermore, an input device 114, for example, a keyboard or a mouse, can be used to input data from a user of the system 105, and screen display 116 or a printer 118 can be used to output data to the user. A disk storage mechanism 121 can be connected to the local interface 112 to transfer data to and from a nonvolatile disk (e.g., magnetic, optical, etc.). The system 105 can be connected to a network interface 123 that allows the system 105 to exchange data with a network 125.

Figure 5:
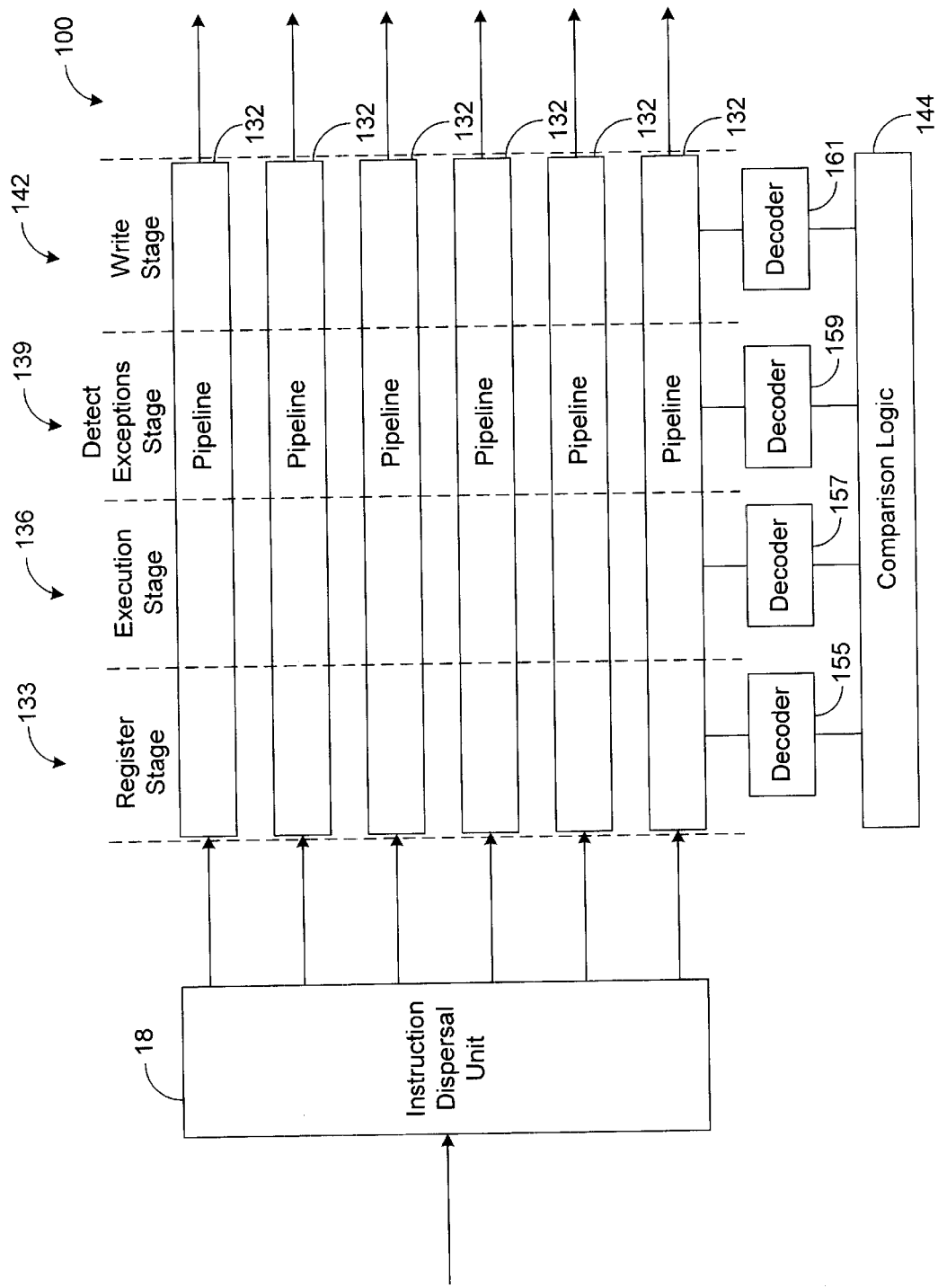
FIG. 5 is a block diagram illustrating the processing system depicted in FIG. 4.

Other than the circuitry for detecting data dependencies and, therefore, data dependency hazards, the configuration of the processing system 100 is preferably the same as the configuration of conventional processing system 15. Therefore, as shown by FIG. 5, the processing system 100 processes instructions via pipelines 132 in a register stage 133, an execution stage 136, a detect exceptions stage 139, and a write stage 142, as described hereinbefore for the conventional system 15. Note that it is possible to divide the processing performed by the pipelines 132 via other stages and other combinations of stages, if desired. Furthermore, although comparison logic 144 is shown in FIG. 5 for simplicity as being coupled to one pipeline 132 via decoders 155, 157, 159, and 161, it should be noted that each pipeline 132 is similarly coupled to comparison logic 144 via similar decoders in the preferred embodiment.

Figure 6:
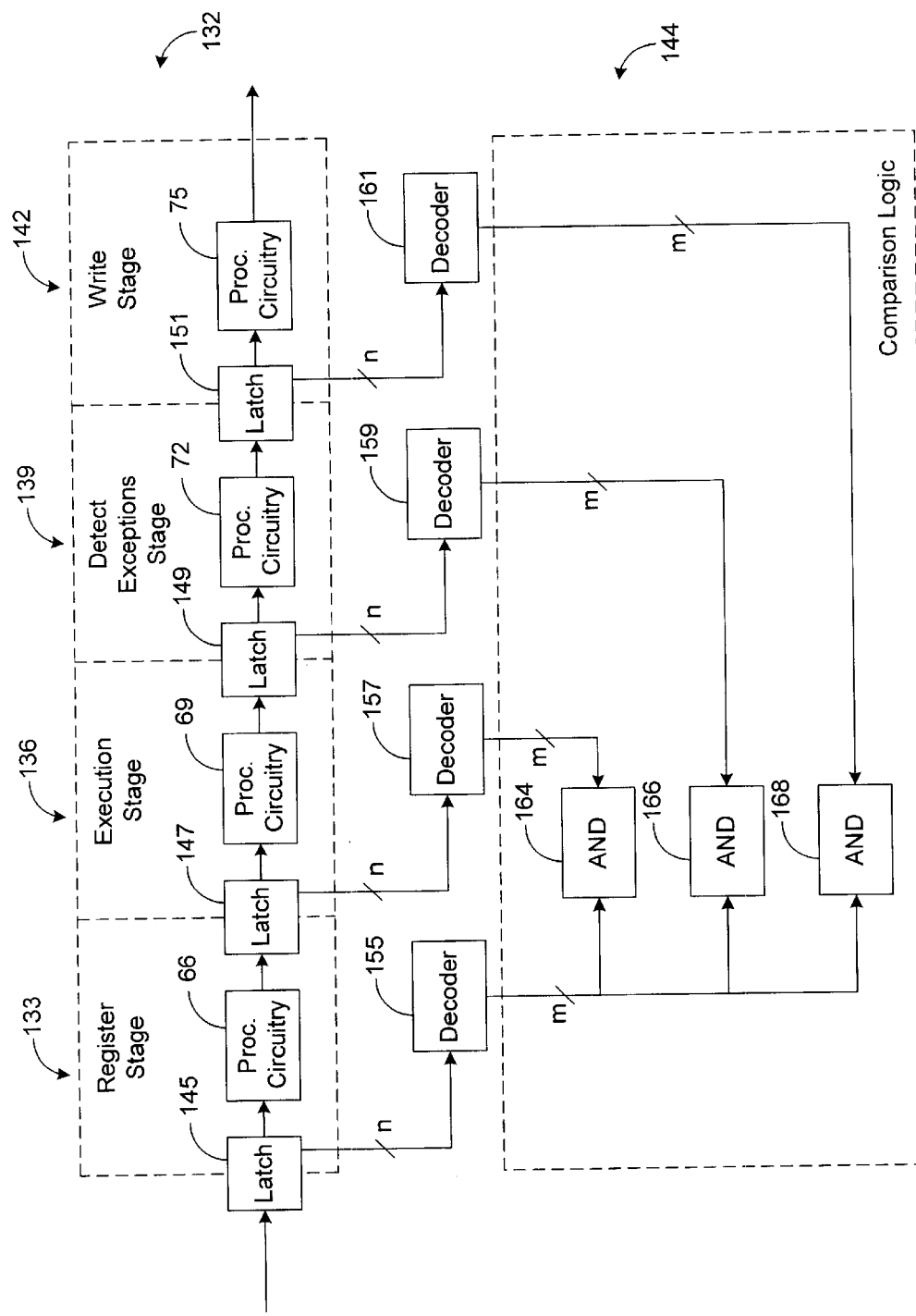
FIG. 6 is a block diagram illustrating a more detailed view of a pipeline and comparison logic depicted in FIG. 5.

As shown by FIG. 6, the processing system 100 includes latches 145, 147, 149, and 151 that are used to control the timing of the system 100. In this regard, through techniques known in the art, latches 145, 147, 149, and 151 respectively latch instructions into processing circuitry 66, 69, 72, and 75. Similar to conventional system 15, the latches 145, 147, 149, and 151 are preferably controlled such that each of the processing circuitry 66, 69, 72, and 75 in each of the stages 133, 136, 139, and 142 only processes one instruction at a time. Furthermore, the pipeline 132 depicted by FIG. 6 may simultaneously process up to four instructions, one instruction for each of the processing circuitry 66, 69, 72, and 75. However, it may be possible for any of the processing circuitry 66, 69, 72 and/or 75 to simultaneously process more than one instruction at a time in other embodiments.

The latches 145, 147, 149, and 151 are configured to respectively transmit to decoders 155, 157, 159, and 161 encoded n-bit register identifiers respectively defined by the instructions being latched by the latches 145, 147, 149, and 151. Therefore, when each of the latches 145, 147, 149, and 151 respectively transmits an instruction to processing circuitry 66, 69, 72, and 75, each of the latches 145, 147, 149, and 151 also respectively transmits an encoded n-bit register identifier defined by the respective instruction to decoders 155, 157, 159, and 161.

Each of the decoders 155, 157, 159, and 161 is designed to decode the received n-bit register identifier into an m-bit register identifier that identifies the same register as the received n-bit register identifier. The value m preferably corresponds to the number of registers associated with the system 100, and each bit in each m-bit register identifier corresponds to a particular register. Each decoder 155, 157, 159, and 161 is preferably configured to determine which register is identified by the received n-bit register identifier and to assert the bit in the m-bit register identifier that corresponds to the identified register. The remainder of the bits in the m-bit register identifier is deasserted. As a result, each m-bit register identifier should have one bit asserted and the remainder of the bits deasserted. The asserted bit corresponds to a register that is utilized by the instruction that included the received n-bit register identifier. It should be noted, however, that other techniques may be employed to decode the n-bit register identifiers and that other identifiers may be used to identify the registers associated with the instructions. U.S. patent application entitled "System and Method for Utilizing Instruction Attributes to Detect Data Hazards," assigned Ser. No. 09/490,389, and filed by the inventors of the present application on Jan. 24, 2000, which is incorporated herein by reference, describes decoders that may be used to implement the decoders 155, 157, 159, and/or 161.

Each decoder 155, 157, 159, and 161 transmits the decoded m-bit register identifier to comparison logic 144, which compares each received m-bit register identifier to at least one other received m-bit register identifier to determine whether or not a data dependency and/or a data dependency hazard exists. Note that a data dependency hazard between two instructions does not exist unless there is a data dependency between the two instructions. Therefore, the detection of a data dependency hazard should also be considered to be a detection of a data dependency.

To illustrate the functionality of comparison logic 144, assume that, similar to conventional system 15, it is desirable to determine whether a consumer in the register stage 133 has a data dependency hazard with any producer in any of the other stages 136, 139, or 142. In this example, assuming that a consumer is in the register stage 133 and that producers are in the other stages 136, 139, and 142, the m-bit register identifier decoded by decoder 155 should be compared to each of the m-bit register identifiers decoded by decoders 157, 159, and 161.

Therefore, as shown by FIG. 6, the m-bit register identifier decoded by decoder 155 is transmitted to AND logic 164, 166, and 168, and the m-bit register identifiers decoded by decoders 157, 159, and 161 are respectively transmitted to AND logic 164, 166, and 168. Each of the AND logic 164, 166, and 168 then compares the received m-bit register identifiers to determine whether or not a data dependency exists between the consumer being processed in the register stage 133 and any of the producers being processed in any of the other stages 136, 139, and 142. If there is a data dependency between the consumer in the register stage 133 and any one of the producers in the other stages 136, 139, and 142 that has yet to produce its data (i.e., has yet to make its data available to the consumer), then the comparison logic 144 determines that a data dependency hazard exists between the consumer and the one producer. Control circuitry (not shown) may then stall the consumer in the register stage 133 (or take other steps) in response to such a determination to prevent a data dependency error.

Figure 7:
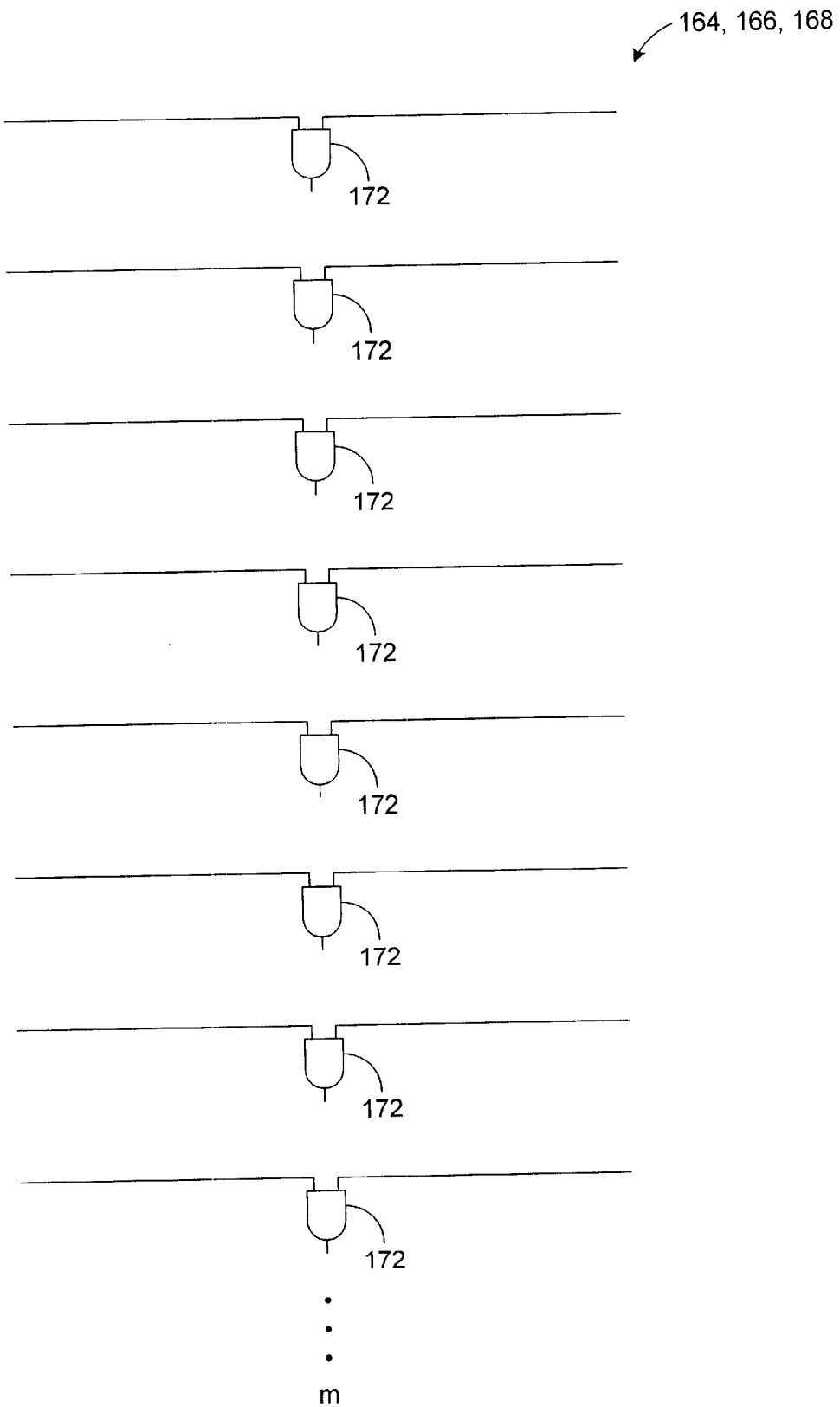
FIG. 7 is a block diagram illustrating a more detailed view of AND logic depicted in FIG. 6.

FIG. 7 shows logic suitable for implementing AND logic 164, 166, and 168. In this regard, each AND logic 164, 166, and 168 includes an m number of AND gates 172 that each receive a bit from one of the received m-bit register identifiers and a bit from the other received m-bit register identifier. Both bits received by each AND gate 172 preferably correspond to the same register. Therefore, if the two received m-bit register identifiers match, one of the AND gates 172 should produce an asserted output. Accordingly, the outputs of the AND gates 172 can be analyzed, and if any of the outputs of the AND gates 172 is asserted, then a determination can be made that a data dependency exists between the instructions that are associated with the matching m-bit register identifiers. To quickly analyze the outputs of AND gates 172, each of the outputs can be transmitted to an OR gate 175 (FIG. 8), which produces an asserted output only when the two compared m-bit register identifiers match.

As a result of the design of the system 100, the amount of circuitry, including wiring, and of space required to detect data dependencies and, therefore, data dependency hazards is reduced as compared to conventional system 15. In particular, the number of wires used in FIG. 2 to transmit register identifiers from stage-to-stage can be significantly reduced, and implementation of the comparison logic 144 can be much simpler and much smaller than the implementation of the n-bit comparators, as described for the comparison logic 24 of FIG. 3. In addition the devices used to implement the decoders 155, 157, 159, and 161 and the comparison logic 144 can be easily arranged to minimize space and wiring complexity. Furthermore, the decoders 155, 157, 159, and 161 may utilize less space than the latches 44, 46, 48, and 52 (FIG. 2). As a result, the circuitry of system 100 for detecting data dependencies and/or data dependency hazards can be much more compact and efficient than the circuitry of conventional system 15.

It should be noted that FIG. 6 depicts circuitry capable of comparing one register identifier from each instruction in the pipeline 132 with other register identifiers. However, it may be possible for instructions to include more than one register identifier. Therefore, additional circuitry, similar to the circuitry of FIG. 6, may be implemented to ensure that each register identifier of each instruction can be tested. For example, the consumer in the register stage 133 may retrieve data from two different registers when executed and, therefore, include two different register identifiers. To accommodate such an instruction, the register stage 133 preferably includes another decoder 155 that decodes the other register identifier into an m-bit register identifier that can be compared to the other m-bit register identifiers in the other stages 136, 139, and 142 by comparison logic. Therefore, it should be apparent to one skilled in the art that the design shown by FIG. 6 can be expanded as necessary to accommodate instructions that are associated with more than one register identifier.

Furthermore, FIG. 6 depicts circuitry for a single pipeline 132. In superscalar systems 100, it is desirable to check for data dependency hazards and, therefore, data dependencies between instructions in different pipelines 132. Therefore, it should be apparent to one skilled in the art that the m-bit register identifiers of instructions in one pipeline 132 can be compared to m-bit register identifiers of instructions in the same or other pipelines 132 according to the techniques described herein to check for data dependencies and/or data dependency hazards between instructions of different pipelines 132. For example, the m-bit register identifier decoded by decoder 155 of one pipeline 132 can be compared to the m-bit register identifiers decoded by decoders 157, 159, and 161 of another pipeline 132 via logic similar to AND logic 164, 166, and 168 to determine whether there is a data dependency and/or data dependency hazard between the instruction in the register stage 133 of the one pipeline 132 and the instructions in the stages 136, 139, and 142 of the other pipeline 132.

Furthermore, it is generally desirable, to compare the register identifier associated with each consumer in the register stage 133 with the register identifiers of each producer in stages 136, 139, and 142, as described herein. However, in other embodiments, the register identifier from any one stage 133, 136, 139, or 142 of any one pipeline 132 can be compared to the register identifier from any one stage 133, 136, 139, or 142 of any one pipeline 132 to determine whether a data dependency exists between the two instructions associated with the compared register identifiers.

In some embodiments, it may be desirable to enable or disable the AND logic 164, 166, and/or 168 or the decoders 155, 157, 159, and/or 161 to prevent comparisons between certain instructions. For example, the comparison logic 144 may include additional circuitry (not shown) that determines whether the data produced by the instructions in the stages 136, 139, and 142 is available for use by the instruction in register stage 133. If the data produced by a producer in stages 136, 139, or 142 is available for use by a consumer in the register stage 133, then there can be no data dependency hazard between the producer and the consumer. Therefore, it may not be desirable to compare the register identifiers of the producer and the consumer, when the data produced by the producer is available.

In such a situation, the additional circuitry can transmit a disable signal to the decoder 157, 159, or 161 processing the register identifier of the producer or can transmit a disable signal to the AND logic 164, 166, or 168 processing the register identifier of the producer. By disabling the decoder 157, 159, or 161 or the AND logic 164, 166, or 168 processing the register identifier of the producer, comparison of the register identifier of the consumer with the register identifier of the producer is prevented. Therefore, an asserted output of any of the AND gates 172 in FIG. 7 indicates not only a data dependency, as described hereinabove for the preferred embodiment, but also indicates a data dependency hazard.

Note that there are a variety of methodologies for disabling the decoders 157, 159, or 161 or the AND logic 164, 166, or 168 in response to a disable signal. In one embodiment, each of the decoders 157, 159, and 161, when disabled, may be configured to clear all of the bits of the m-bit register identifier transmitted by the disabled decoder 157, 159, or 161. As a result, the m-bit register identifier transmitted by a disabled decoder 157, 159, or 161 should not produce an asserted output at any one of the AND gates 172 depicted in FIG. 7.

Figure 8:
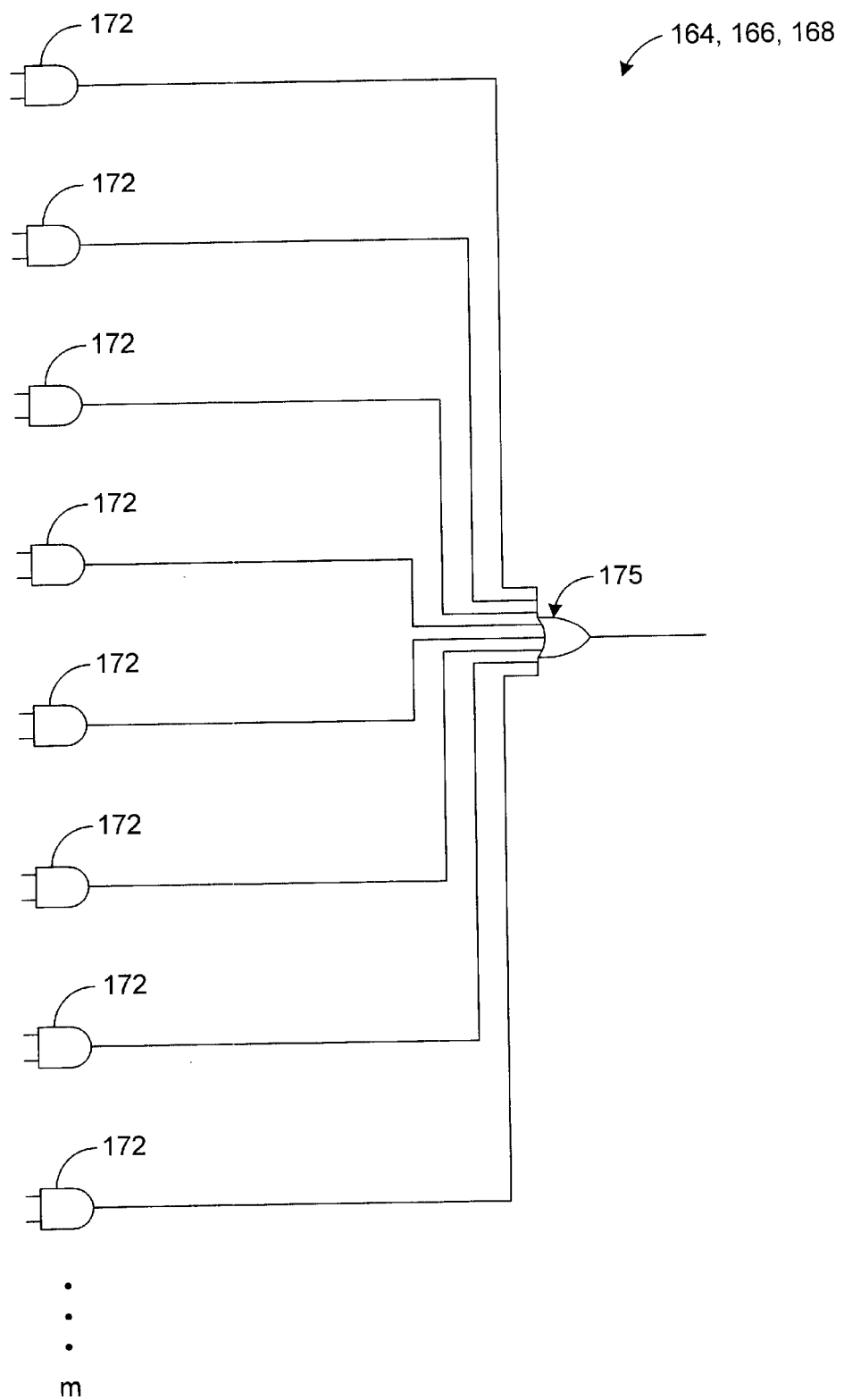
FIG. 8 is a block diagram illustrating another embodiment of the AND logic depicted in FIG. 7.

In another embodiment, each AND logic 164, 166, and 168 may be respectively configured to AND the output of OR gate 175 in FIG. 8 with a signal that indicates whether or not the respective AND logic 164, 166, and 168 is disabled. In response to a disable signal, the respective AND logic 164, 166, and 168 ANDs the output of OR gate 175 with a deasserted signal, and when not receiving a disable signal, the respective AND logic 164, 166, and 168 ANDs the output of OR gate 175 with an asserted signal. As a result, each AND logic 164, 166, and 168 can produce an asserted output only when the respective AND logic 164, 166, and 168 is not receiving a disable signal. Note that there may be other methodologies and other situations for disabling the decoders 157, 159, and 161 and/or the AND logic 164, 166, and 168 in other embodiments. Furthermore, in situations in which is desirable to prevent comparisons of the register identifier of the instruction in the register stage 133, the decoder 155 and/or AND logic 164, 166, and 168 may be disabled according to the techniques described above.

It should be further noted that the principles of the present invention may be utilized to detect write-after-write (WAW) hazards. A WAW hazard exists (1) when an earlier instruction and a later instruction both write to the same register and (2) before the earlier instruction actually writes to the register. Similar to detecting data dependency hazards, a WAW hazard can be detected by determining whether two write instructions include the same register identifiers. Therefore, the circuitry described hereinbefore can be utilized to detect when two write instructions utilize the same register. Then, additional circuitry can be used to determine whether data from the earlier instruction has been written to the register. The aforementioned information can then be used to determine whether a WAW hazard exists.

Operation

The use and operation of the preferred embodiment of the system 100 will be described hereafter.

Assume for illustrative purposes that each of the stages 133, 136, 139, and 142 of FIG. 6 is processing an instruction and that it is desirable to determine whether a data dependency hazard exists between the instruction in the register stage 133 and any of the instructions in the other stages 136, 139, and 142. As the latch 145 latches the instruction entering the register stage 133 and provides the instruction to the processing circuitry 66, the latch 145 also provides to decoder 155 the n-bit register identifier included in the instruction. The decoder 155 decodes the received n-bit register identifier into an m-bit register identifier according to the techniques described hereinabove for the preferred embodiment. Therefore, the m-bit register identifier should have one asserted bit that corresponds with the register utilized by the instruction in the register stage 133, when this instruction is executed. The decoder 155 then transmits the m-bit register identifier to AND logic 164, 166, and 168.

As the latch 147 latches the instruction entering the execution stage 136 and provides the instruction to the processing circuitry 69, the latch 147 also provides to decoder 157 the n-bit register identifier included in the instruction. The decoder 157 decodes the received n-bit register identifier into an m-bit register identifier according to the techniques described hereinabove for the preferred embodiment. Therefore, the m-bit register identifier should have one asserted bit that corresponds with the register utilized by the instruction in the execution stage 136, when this instruction is executed, The decoder 157 then transmits the m-bit register identifier to AND logic 164.

As the latch 149 latches the instruction entering the detect exceptions stage 139 and provides the instruction to the processing circuitry 72, the latch 149 also provides to decoder 159 the n-bit register identifier included in the instruction. The decoder 159 decodes the received n-bit register identifier into an m-bit register identifier according to the techniques described hereinabove for the preferred embodiment. Therefore, the m-bit register identifier should have one asserted bit that corresponds with the register utilized by the instruction in the detect exceptions stage 139, when this instruction is executed. The decoder 159 then transmits the m-bit register identifier to AND logic 166.

As the latch 151 latches the instruction entering the write stage 142 and provides the instruction to the processing circuitry 75, the latch 151 also provides to decoder 161 the n-bit register identifier included in the instruction. The decoder 161 decodes the received n-bit register identifier into an m-bit register identifier according to the techniques described hereinabove for the preferred embodiment. Therefore, the m-bit register identifier should have one asserted bit that corresponds with the register utilized by the instruction in the write stage 142, when this instruction is executed. The decoder 161 then transmits the m-bit register identifier to AND logic 168.

Then, the aforementioned m-bit register identifiers are compared by AND logic 164, 166, and 168 to determine whether a data dependency exists between the instruction in the register stage 133 and any of the instructions in the other stages 136, 139, and 142. In this regard, the AND logic 164, 166, and 168 indicates that such a data dependency exists when the asserted bit in the m-bit register identifier transmitted from decoder 155 and the asserted bit in at least one of the m-bit register identifiers transmitted from decoders 157, 159, and 161 correspond to the same register. The aforementioned information may then be used to determine whether a data hazard exists between the instruction in the register stage 133 and any of the instructions in the later stages 136, 139, and/or 142. Examples of data hazards that may be detected by utilizing the principles of the present invention include read-after-write (RAW) hazards, write-after-read (WAR) hazards, and write-after-write (WAW) hazards.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore, the following is claimed:

1. A computer system for processing instructions of a computer program, comprising:

a least one pipeline configured to simultaneously process a plurality of instructions, each one of said plurality of instructions including an encoded register identifier;

a first decoder coupled to a first stage said pipeline, said first decoder configured to decode an encoded register identifier of one of said plurality of instructions into a first decoded register identifier, said first decoded register identifier including one asserted bit corresponding with one of a plurality of registers associated with the computer system;

a second decoder coupled to a second stage said pipeline, said second decoder configured to decode said encoded register identifier into a second decoded register identifier, said second decoded register identifier including one asserted bit corresponding with one of said plurality of registers associated with the computer system; and comparison logic interfaced with said first and second decoders, said comparison logic configured to respectively compare said first decoded register identifier and said second decoded register identifier to other decoded register identifiers, said other decoded register identifiers decoded from encoded register identifiers of others of said instructions.

2. The computer system of claim 1, wherein said comparison logic is further configured to detect a data dependency hazard based on a comparison, by said comparison logic, of one of said first and second decoded register identifiers with one of said other decoded register identifiers.

3. The computer system of claim 1, wherein:

said first decoded register identifier includes a first plurality of bits corresponding respectively with a plurality of registers;

one of said first plurality of bits corresponding with one of said plurality of registers is asserted and a remainder of said first plurality of bits is deasserted;

said second decoded register identifier includes a second plurality of bits corresponding respectively with said plurality of registers; and one of said second plurality of bits corresponding with said one of said registers is asserted and a remainder of said second plurality of bits is deasserted.

4. The computer system of claim 1, wherein said pipeline is configured to simultaneously process said one of said plurality of instructions in a first stage of said pipeline and another of said plurality of instructions in a second stage of said pipeline, and wherein said first decoder is coupled to said first stage and said second decoder is coupled to said second stage.

5. The computer system of claim 1, further comprising:

a third decoder coupled to a third stage of said pipeline, said third decoder configured to decode an encoded register identifier of another of said plurality of instructions into a third decoded register identifier, wherein said comparison logic is interfaced with said third decoder and is further configured to compare said third decoded register identifier with said first decoded register identifier.

6. A processing system for processing instructions of a computer program, comprising:

a pipeline configured to simultaneously process a first instruction in a first stage of said pipeline and a second instruction in a second stage of said pipeline;

a first decoder coupled to said first stage and configured to receive a first encoded register identifier associated with said first instruction, said first decoder configured to decode said first encoded register identifier into a first decoded register identifier;

a second decoder coupled to said second stage and configured to receive a second encoded register identifier associated with said second instruction, said second decoder configured to decode said second encoded register identifier into a second decoded register identifier; and comparison logic interfaced with said first and second decoders, said comparison logic configured to receive said first and second decoded register identifiers and to respectively compare said first and second decoded register identifiers to other register identifiers, said other decoded register identifiers decoded from encoded register identifiers of other decoded instructions;

wherein said first decoded register identifier and said second decoded register identifier each including one asserted bit corresponding with one of a plurality of registers associated with the processing system.

7. The system of claim 6, wherein said comparison logic is further configured to detect a data dependency hazard based on a comparison, by said comparison logic, of one of said first and second decoded registers to one of said other register identifiers.

8. The system of claim 6, wherein:

said first decoded register identifier includes a first plurality of bits corresponding respectively with a plurality of registers;

one of said first plurality of bits corresponding with one of said registers is asserted and a remainder of said first plurality of bits is deasserted;

said second decoded register identifier includes a second plurality of bits corresponding respectively with said plurality of registers; and one of said second plurality of bits corresponding with one of said registers is asserted and a remainder of said second plurality of bits is deasserted.

9. A method for detecting a data dependency hazard processing instructions of a computer program, comprising the steps of:

transmitting a plurality of instructions to a processing system, said processing system having a pipeline;

producing a first decoded register identifier by decoding an encoded register identifier associated with one of said plurality of instructions while said one of said plurality of instructions is being processed by a first portion of said pipeline;

producing a second decoded register identifier by decoding said encoded register identifier while said one instruction is being processed by a second portion of said pipeline;

producing a third decoded register identifier by decoding an encoded register identifier associated with another of said plurality of instructions;

producing a fourth decoded register identifier by decoding an encoded register identifier associated with another of said plurality of instructions;

comparing said first decoded register identifier to said third decoded register identifier;

comparing said second decoded register identifier to said fourth decoded register identifier; and detecting a data dependency hazard based on one of said comparing steps;

wherein each of said producing a first decoded register identifier step and said producing a second decoded register identifier step includes the steps of:

defining a plurality of bits corresponding respectively with a plurality of registers associated with the processing system; and asserting one of said bits that correspond to a register utilized in said executing step.

* * * * *